United States Patent [19]

Beavon

[11] 4,146,580
[45] Mar. 27, 1979

[54] PROCESS FOR HYDROGEN SULFIDE PRODUCTION

[75] Inventor: David K. Beavon, Pasadena, Calif.

[73] Assignee: The Ralph M. Parsons Company, Pasadena, Calif.

[21] Appl. No.: 807,919

[22] Filed: Jun. 20, 1977

[51] Int. Cl.$^2$ .................. C01B 17/16; C01B 31/26
[52] U.S. Cl. .................................. 423/564; 423/563; 423/415 A; 423/443
[58] Field of Search .................. 423/415, 563–565, 423/443

[56] References Cited

U.S. PATENT DOCUMENTS

| | | | |
|---|---|---|---|
| 1,173,566 | 2/1916 | Carner et al. | 423/563 |
| 3,579,302 | 5/1971 | Sefton | 423/563 |
| 3,961,035 | 6/1976 | Mickley | 423/564 |
| 4,094,961 | 6/1978 | Beavon | 423/564 |

FOREIGN PATENT DOCUMENTS

| | | | |
|---|---|---|---|
| 47-27634 | 7/1972 | Japan | 423/415 |
| 952555 | 3/1964 | United Kingdom | 423/564 |

Primary Examiner—O. R. Vertiz
Assistant Examiner—Gary P. Straub
Attorney, Agent, or Firm—Christie, Parker & Hale

[57] ABSTRACT

A hydrocarbon is partially oxidized in the presence of steam and oxygen in a high temperature reducing flame zone to which sulfur is added in excess of the quantity of hydrogen and carbon monoxide formed to generate a second flame zone. The gas stream is rapidly cooled to prevent further reactions, then further cooled to condense sulfur to the extent of providing unreacted hydrogen and carbon monoxide in a molar excess over the residual sulfur present in the gas stream. The resultant gas stream is passed to a catalytic conversion zone where residual sulfur and carbonyl sulfide are converted to hydrogen sulfide. A formed gas stream free of sulfur and sulfur dioxide may be cooled to below the dew point of water to remove water prior to use.

28 Claims, 1 Drawing Figure

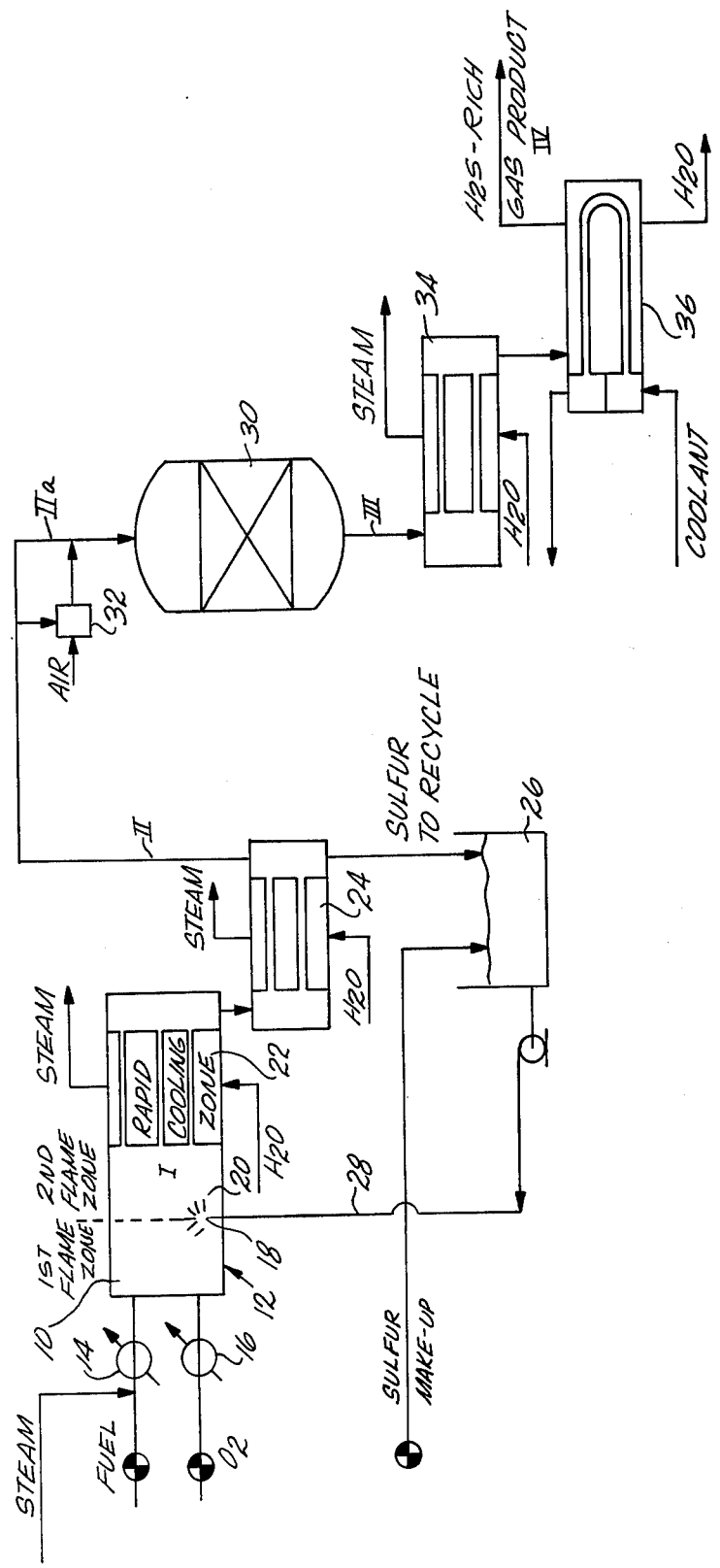

PROCESS FOR HYDROGEN SULFIDE PRODUCTION

BACKGROUND OF THE INVENTION

Gas streams rich in hydrogen sulfide are needed for many industrial processes such as hydrometallurgical processes and in the conversion of sulfur dioxide contained in flue gases to sulfur.

Two processes are known to have been used industrially for production of $H_2S$.

In one, elemental sulfur is reacted with high-purity hydrogen at temperatures from 800° F. to 1000° F. A deficiency of the process is that the required high-purity hydrogen is costly, being made by steam reforming of expensive fuels such as methane or selected light napthas. An even greater deficiency is that neither of these may be available at a location where the $H_2S$ is needed. Severe corrosion of metal alloy equipment has been experienced.

Another involves mixing sulfur vapor with methane and heating the mixture to a temperature about 1250° F. to 1350° F. in fired tubes. Corrosion of the tube walls is a serious problem, since the tube walls are necessarily at a higher temperature to enable heat transfer through the tube walls.

The above processes entail that excess sulfur exists in the gas mixture after reaction. When the reaction products are cooled, sulfur condenses out above the melting point of sulfur. It is, however, usually necessary to cool the gas to about ambient temperature before use, and in cooling from the sulfur melting point to ambient temperature solid sulfur deposits on heat transfer surfaces and blocks the transfer of heat, thereby presenting serious practical problems.

A need exists, therefore, for a process to produce hydrogen sulfide from a low cost fuel, which avoids problems of fouling by excess sulfur and high-temperature corrosion of metals by sulfur and sulfur compounds.

SUMMARY OF THE INVENTION

There is provided a process for the production of hydrogen sulfide which comprises first generating in a first flame zone of a thermal reaction zone a gaseous stream comprising hydrogen and carbon monoxide by partial oxidation or gasification of a hydrocarbon in the presence of steam and oxygen to form a reducing flame containing hydrogen, carbon monoxide and steam. Sulfur is added to the thermal reaction zone, preferably in a molar excess of the amount of hydrogen and carbon monoxide present in the reducing flame, more preferably in about a 10 to about a 100 percent molar excess of the molar amount of hydrogen and carbon monoxide. Sulfur addition forms a second flame zone having a temperature of at least about 1200° F., preferably 1500° F., and more preferably above about 2000° F.

A portion of the generated hydrogen and carbon monoxide react with sulfur to form hydrogen sulfide and carbonyl sulfide. The degree of reaction produces a major portion, i.e. 50% or more of the hydrogen sulfide produced in this process. This yields a first vapor stream containing steam, unreacted hydrogen, carbon monoxide and sulfur and formed hydrogen sulfide and carbonyl sulfide. Carbon disulfide may also be formed.

The vapor stream is rapidly cooled to a temperature sufficiently low to substantially prevent further reaction of hydrogen and carbon monoxide with sulfur. Preferably, the vapor stream is cooled to about 800° F. or less within a time less than 2 seconds, preferably less than 1 second, and more preferably less than 0.5 second.

The reactions of sulfur with hydrogen or carbon monoxide to form hydrogen sulfide or carbonyl sulfide are exothermic. Were these to occur only within a catalyst bed, while producing $H_2S$ at high concentration, the gas temperature rise within a catalyst bed would be undesirably high, requiring staging of the reaction, with intercooling, to protect the catalyst from destructive temperatures. In the instant invention, the major part of the sulfur reacts thermally with most of the exothermic heat of reaction dissipated by vaporizing introduced sulfur and in generating useful steam in the rapid cooling steps. The catalytic step is reserved for completing the residual transforming reactions with minimal temperature rise requiring no complex controls.

The vapor stream is further cooled to a temperature above the melting point of sulfur to condense sulfur in a quantity to yield a second vapor stream containing residual sulfur vapor wherein the amount of carbon monoxide and hydrogen present are in a stoichiometric excess of the amount required to react with the residual sulfur in the second vapor stream. Preferably, the cooled gas stream provides at least about 1 to about 10 percent molar excess, preferably about 1 to about 3 percent of the sum of hydrogen and carbon monoxide to sulfur.

The residual sulfur is catalytically converted in a catalytic conversion zone maintained at a temperature from about 300° to about 900° F., wherein hydrogen sulfide is formed at least by reaction of contained hydrogen with sulfur, contained carbon monoxide with sulfur to form carbonyl sulfide simultaneous with hydrolysis of at least a portion of carbonyl sulfide present and formed to hydrogen sulfide. The preferred conversion temperature is from about 500° to about 900° F. or more, preferably from about 600° to about 800° F.

To the extent necessary, the gas stream after sulfur condensation, is reheated to a temperature consonant to the catalytic conversion operation. The product gas stream of high hydrogen sulfide concentration may, as required, be safely cooled to below the dew point of water to condense water.

THE DRAWING

The attached drawing illustrates apparatus as may be used to carry out the process of this invention and shows points of gas composition as described in the accompanying Examples.

DETAILED DESCRIPTION

The present invention is directed to a process for the production of a hydrogen sulfide rich gas from elemental sulfur.

With reference to the Drawing, the process begins in a first thermal reaction stage having two flame zones, wherein in the second, $H_2S$ and COS are thermally formed by reaction of sulfur with a portion of hydrogen and carbon monoxide thermally generated in the first thermal reaction zone, at a temperature of at least above 1200° F., preferably above about 1500° F., preferably above about 2000° F. to the extent that a major portion of the hydrogen sulfide produced in the process is generated in the second thermal reaction zone. Some $CS_2$ may be formed.

The thermal reaction zone is followed by rapid cooling typically to below about 800° F. to minimize sulfur consuming reactions.

The gas stream is cooled further to a temperature between the dew and melting points of sulfur with attendant condensation and removal of excess sulfur to leave a gas stream containing a stoichiometric deficiency of sulfur for reaction with residual hydrogen and carbon monoxide. The gas stream may be reheated, but in any event is provided to a catalytic zone at a temperature suitable for catalytic reactions to hydrogenate sulfur and sulfur dioxide and hydrolyze COS and $CS_2$.

An essential element of the invention is that at the thermal reaction temperatures employed, hydrogen and carbon monoxide coexist with excess sulfur even when chemical equilibrium is reached, the gas stream contains substantial concentrations of hydrogen and carbon monoxide, as well as sulfur. When the gas stream is cooled rapidly to preferably about 800° F. or below, its composition becomes essentially "frozen." The result is that gas stream fed to a catalytic reactor contains $H_2$ and CO in stoichiometric excess over the remaining sulfur vapor. This enables catalytic reactions which include:

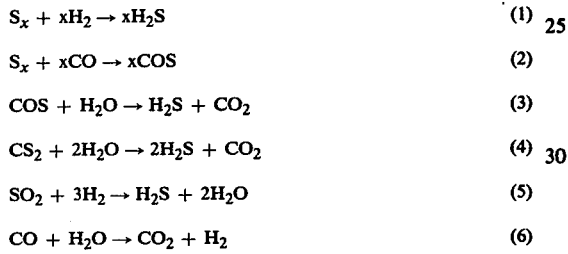

$$S_x + xH_2 \rightarrow xH_2S \quad (1)$$

$$S_x + xCO \rightarrow xCOS \quad (2)$$

$$COS + H_2O \rightarrow H_2S + CO_2 \quad (3)$$

$$CS_2 + 2H_2O \rightarrow 2H_2S + CO_2 \quad (4)$$

$$SO_2 + 3H_2 \rightarrow H_2S + 2H_2O \quad (5)$$

$$CO + H_2O \rightarrow CO_2 + H_2 \quad (6)$$

At the conclusion of the catalytic reactions both elemental sulfur and sulfur dioxide are essentially absent, and the gas product may be cooled as much as desired without danger of blocking cooling surfaces with solid sulfur and/or without corrosion by an aqueous condensate containing sulfurous and polythionic acids.

More particularly, and with reference to the Drawing, the process starts with generating a reducing agent, i.e. $H_2$ and CO, needed to convert elemental sulfur to hydrogen sulfide and carbonyl sulfide. This occurs by partial oxidation or gasification of a hydrocarbon in the presence of water as steam and a source of oxygen such as air or oxygen enriched air in first flame zone 10 of reactor 12. Hydrocarbons ranging from those liquefiable at ambient temperatures such as liquefied petroleum gas, i.e. propane and/or butane, to residual fuel oil and even particulate solid carbonaceous materials may be used. It is preferred to use normally liquid, but vaporizable hydrocarbons. The balance considering cost, availability, and convenience, favors using kerosene, furnace oil, diesel fuel and the like. More conventional reactants such as methane may also be used and hydrogen may be added as a supplement at the expense of increased fuel cost. Flame temperature is above about 2000° F., typically from 2100° F. to about 3000° F. or more as dictated by materials of construction. To maintain high flame temperatures, preheating of the reactants in exchangers 14 and 16 is desirable. When the fuel is a normally liquid hydrocarbon, it is preferred to preheat the hydrocarbon to at least about 200° F. and/or vaporize at least half of the fuel ahead of the flame zone.

Steam is provided to aid in the combustion process and for use in subsequent steps of the process. Steam has several functions. Steam assists in vaporizing and atomizing the hydrocarbon fuel, suppresses the formation of solid carbon in flame zone 10 and enables downstream hydrolysis of carbonyl sulfide and carbon disulfide in the catalytic reactor. To the latter end, the amount of steam is preferably provided to yield a product gas containing about 2 volume percent steam or more.

In using diesel fuel oil with an ASTM distillation boiling range of about 400° F. to 700° F., for example, the diesel fuel oil, may be mixed with steam in the proportion of from about 0.5 to about 3 pounds of steam per pound of fuel, preferably about 1 pound per pound.

As indicated, preheating of the fuel and steam, as well as the source of oxygen in exchangers 14 and 16, assists in maintaining a high thermal reaction temperature while reducing the quantity of fuel and air used in the process. To this end, the extent of preheat used is decided largely by economic considerations. Fuel and steam may be preheated separately or in admixture. It is most preferred to preheat a mixture of fuel and steam to the end of substantially vaporizing all the fuel.

Liquid sulfur is sprayed from nozzle 18 to form a second flame zone 20 in which the required further thermal reactions occur. The principal reactions are:

$$xH_2 + S_x \rightarrow xH_2S \quad (1)$$

$$xCO + S_x \rightarrow xCOS \quad (2)$$

$CS_2$ may be formed by reactions such as:

$$xC + 2S_x \rightarrow xCS_2 \quad (7)$$

Conditions in the second flame or thermal reaction zone are critical. An excess of sulfur is required with a major portion converted to $H_2S$ and COS. Sulfur serves to form $H_2S$ and COS by reaction with flame products and wash out any solid unreacted carbon or tarry material formed in the flame. Also, as will be pointed out, after condensation of excess sulfur, there must be an excess of $H_2$ and CO to function in the catalytic stage.

To achieve the simultaneous presence of elemental sulfur, hydrogen and carbon monoxide in addition to formed hydrogen sulfide and carbonyl sulfide, the net thermal reaction temperature in the second flame zone must be at least about 1200° F., preferably above about 1500° F. and more preferably above 2000° F. Temperatures above 2000° F. speed the thermal reactions and reduce recycle of solid carbon, but require consumption of more fuel and air.

Although reactions (1) and (2) above are exothermic the vaporization of liquid sulfur sprayed into the second reaction zone absorbs the exothermic heat.

To preclude free sulfur from continuing to react with free $H_2$ and CO, it is necessary to rapidly cool the thermal products to a temperature at which the rate of sulfur consuming reactions becomes negligibly slow. A preferred temperature is about 800° F. or less. Rapid cooling may be accomplished by passing products of the thermal reactor 12 through the tubes of a fire tube steam boiler 22 with a residence time of gas in the tubes of about 2 seconds or less, preferably 1 second or less, and more preferably 0.5 second or less.

The gases are then further cooled in condenser 24 to remove most of the sulfur, which is separated and removed as a liquid with any collected free carbon and tars. Cooling is at least sufficient to reduce the quantity of remaining sulfur vapor to less than the stoichiometric equivalent of $H_2$ + CO in the gas mixture, such that the ensuing catalytic hydrolysis and hydrogenation step will result in substantially all the sulfur species being converted to $H_2S$. The lower limit of cooling is the melting point of sulfur at the gas composition employed, typically about 240° F., while the upper limit ordinarily will be below about 600° F. It is preferred that the sum of hydrogen and carbon monoxide in the gas stream at this junction be at least about 1 molar percent above the residual sulfur vapor present, preferably from about 1 to about 10 percent molar excess, more preferably from about 1 to about 3 percent molar excess. A still larger excess is beneficial, but may be uneconomical.

The sulfur condensate with any carbon and tars which would foul the catalyst if allowed to remain in the vapor stream, is recycled from pit 26 by line 28 back to the thermal reaction zone 20 wherein the carbon is converted to gaseous products ($CS_2$) and most of the sulfur to $H_2S$ and COS. From sulfur condenser 24, the vapor stream is passed to catalytic reactor 30 where the principal reactions are:

$$S_x + xH_2 \rightarrow xH_2S \quad (1)$$

$$S_x + xCO \rightarrow xCOS \quad (2)$$

$$COS + H_2O \rightarrow CO_2 + H_2S \quad (3)$$

$$CS_2 + 2H_2O \rightarrow CO_2 + 2H_2S \quad (4)$$

$$SO_2 + 3H_2 \rightarrow H_2S + 2H_2O \quad (5)$$

$$CO + H_2O \rightarrow CO_2 + H_2 \quad (6)$$

Depending on the metal(s) selected, catalysts may be functional at temperatures as low as 300° F. However, because the principal object is to rid the vapor stream of sulfur, carbonyl sulfide and carbon disulfide by their ultimate conversion to hydrogen sulfide, the preferred operating temperature is from about 500° to about 900° F., more preferably from about 600° to about 800° F. Useful catalysts are those containing metals of Groups Va, VIa, VIII and the Rare Earth Series of the Periodic Table defined by Mendeleeff, published as the "Periodic Chart of the Atoms" by W. N. Welch Manufacturing Company, published also in "Business Week," Apr. 10, 1965, page 56, incorporated herein by reference. The catalysts are preferably supported on a silica, alumina or silica-alumina base with alumina preferred. The preferred catalysts are those containing one or more of the metals, cobalt, molybdenum, iron, chromium, vanadium, thoria, nickel, tungsten (W), paladium, plantinum, uranium (U), and the like.

Reheating of the gas stream may be required and this may be effected by any desired means. One method is to add air (oxygen) to a portion of the gas stream, thermally oxidizing the same in heater 30 to raise gas temperature, then recombining the vapor streams to achieve a desired reaction inlet temperature.

To drive reactions (3), (4) and (6) toward completion an appreciable quantity of water vapor is needed. To insure hydrogenation of sulfur and sulfur dioxide as may be generated in heater 32 is essentially complete, a residual excess of at least one volume percent $H_2 + CO$ is preferably provided, and about a three volume percent excess desired. Higher contents of ($H_2 + CO$) may be used, but are not required.

After the catalytic hydrogenation-hydrolysis reactions, the gases may be cooled as desired, without danger of blockage by solid sulfur or of corrosion by wet sulfurous and polythionic acids. In this operation, useful steam may be generated in a waste heat boiler 34, as illustrated, and water unnecessary to product gas utilization may be condensed in condenser 36 and removed.

The process of the instant invention avoids the corrosion problems of prior processes. In no instance is it necessary to drive heat through a metal wall into a corrosive fluid, as the only heaters used are employed in conjunction with heating of noncorrosive fuel, steam and/or air. The thermal reactions are contained in a refractory-lined combustion chamber, constructed according to known practice in Claus type plants making sulfur from hydrogen sulfide. The tubes of all coolers operate near or below steam temperatures, and at such temperatures the gases are essentially noncorrosive to carbon steel. Attach by wet sulfur dioxide, i.e. sulfurous and polythionic acids is avoided by complete hydrogenation before cooling to a water dew point. In addition, the heat of the thermal reaction, which is the bulk of heat generated in the process, is removed from the gases before catalyst contact to preserve the catalyst.

EXAMPLE 1

In flame zone 10 of reactor 12, there is fed diesel fuel ($CH_{1.84}$) in the amount of 93.93 lb. moles per hour, steam in the amount of 105 lb. moles per hour, and moist air in the amount of 243.71 lb. moles per hour. The diesel fuel, steam and air are preheated in exchangers 14 and 16 to a temperature of 700° F. The resulting primary adiabatic flame temperature in flame zone 10 is 2000° F. Essentially complete gasification of carbon occurs.

Liquid sulfur as 59 in the amount of 30 lb. moles per hour is fed through nozzle 18 to form a second flame zone 20. The amount of sulfur introduced is in a quantity of about 40% in excess of that required to consume the amount of carbon monoxide and hydrogen generated in the first flame zone to yield hydrogen sulfide and carbonyl sulfide. The resulting second flame zone temperature is 1660° F.

As shown by column I, total $H_2S$ + COS formed in the thermal reaction zone is 148.64 mols/hr or 86 percent of the ultimate total of 171.33 mols/hr shown in columns III and IV. Thus, about 86 percent of the exothermic heat of the process is released in the thermal zone, permitting ready removal in the rapid cooling zone and protecting the catalyst bed against excessive temperature rise. Said temperature rise is from 500° F. to 682° F., an increase of only 182° F.

At adiabatic equilibrium, hydrogen and carbon monoxide content of the gas stream is 27.53 lb. moles per hour. The composition of the gas stream entering the rapid cooling zone 22 is shown in column I of Table 1.

The stream is rapidly cooled to a temperature below 800° F. and excess sulfur condensed to form a stream of the composition shown in column II of Table 1. At a net temperature of 500° F., the amount of elemental sulfur remaining in the vapor stream is 22.26 lb. moles expressed as $S_1$, which is stoichiometrically less than the available 27.53 lb. moles of $H_2$ + CO.

After treatment in a catalytic reaction zone employing a cobalt molydate catalyst at an exit temperature of 682° F., there is formed a stream having compositions shown in column III of Table 1. Essentially all of the elemental sulfur, COS and $CS_2$ are converted to $H_2S$ with substantially all of the COS also converted to $H_2S$. About 95% of the CO present is shifted in the presence of the catalyst to hydrogen for reaction to $H_2S$. Sulfur dioxide is absent.

The gas stream is cooled to a temperature of 135° F. without blockage of cooling surfaces by formation of solid sulfur or initiation of corrosion. The final gas stream shown in column IV of Table 1 has a hydrogen sulfide content of about 35 volume percent.

Table 1

| Component (lb. moles/hr) | I | II | III | IV |
|---|---|---|---|---|
| $H_2S$ | 140.45 | 140.45 | 170.06 | 170.06 |
| $SO_2$ | 0.00 | 0.00 | 0.00 | 0.00 |
| $H_2O$ | 49.03 | 49.03 | 24.81 | 24.81 |
| $O_2$ | 0.00 | 0.00 | 0.00 | 0.00 |
| $N_2$ | 187.03 | 187.03 | 187.03 | 187.03 |
| $S_2$ | 45.41 | 0.01 | 0.00 | 0.00 |
| $S_4$ | 0.02 | 0.00 | 0.00 | 0.00 |
| $S_6$ | 0.00 | 1.64 | 0.00 | 0.00 |
| $S_8$ | 0.00 | 1.55 | 0.00 | 0.00 |
| $CO_2$ | 67.79 | 67.79 | 91.78 | 91.78 |
| $H_2$ | 9.80 | 9.80 | 4.41 | 4.41 |
| CO | 17.73 | 17.73 | 0.87 | 0.87 |
| COS | 8.19 | 8.19 | 1.27 | 1.27 |
| $CS_2$ | 0.23 | 0.23 | 0.00 | 0.00 |
| Total | 525.88 | 488.45 | 480.25 | 480.25 |
| Temperature, ° F. | 1666 | 500 | 682 | 135 |
| Pressure, psia | 50 | 50 | 50 | 50 |

EXAMPLE 2

Following the procedure of Example 1, diesel fuel in an amount of 95.81 lb. moles per hour, 105 lb. moles per hour of steam and 243.71 lb. moles per hour of moist air are fed to the flame zone. Sulfur fed to the second flame zone as $S_8$ is 23.6 lb. moles per hour. Sulfur feed is in the amount of 123 percent of the theoretical requirement and the amount of diesel fuel increased slightly. The resultant thermal reaction temperature is 1821° F.

As shown by column I of Table 2, total $H_2S$ + COS formed in the thermal reaction zone is 129.95 mols/hr or 85 percent of the ultimate total of 152.68 mols/hr shown in columns III and IV. Thus, about 85 percent of the exothermic heat of the process is released in the thermal zone at the level of 1821° F., which is convenient for generating useful steam in the rapid cooling step. The temperature rise in the catalyst bed is 243° F., and the catalyst outlet temperature is 842° F. and occurs without harm to the catalyst.

After rapid quench and condensation of liquid sulfur removal at 500° F., the gas still contains a substantial excess of $H_2$ and CO over that required to react with residual sulfur in the vapor stream.

A minor amount of air is added to the heater 32 along with a portion of the stream from condenser 24. The hot combustion products are mixed with the balance of the gas to provide a net gas stream at a temperature of 600° F. which is fed to the catalytic conversion zone 30. After passing through the catalytic conversion zone 30, the gas is cooled to 130° F. to condense out 25% of the water vapor. The contained sulfur is less than 1 ppm $S_2$ permitting cooling of the gas to below 135° F. without fouling cooling surfaces. The $SO_2$ content of the final gas is about 2.6 parts per billion, while hydrogen sulfide content of the gas stream is at a level of 31 volume percent. Gas composition and operating conditions at various points in the process are shown in Table 2.

Table 2

| Component (lb. moles/hr) | I | II | III | IV | V |
|---|---|---|---|---|---|
| $H_2S$ | 123.47 | 123.47 | 121.77 | 150.85 | 150.85 |
| $SO_2$ | 0.00 | 0.00 | 1.83 | 0.00 | 0.00 |
| $H_2O$ | 57.73 | 57.73 | 59.82 | 32.81 | 24.70 |
| $O_2$ | 0.00 | 0.00 | 0.00 | 0.00 | 0.00 |
| $N_2$ | 187.02 | 187.02 | 197.35 | 197.35 | 197.35 |
| $S_2$ | 29.25 | 0.01 | 0.05 | 0.00 | 0.00 |
| $S_4$ | 0.00 | 0.00 | 0.00 | 0.00 | 0.00 |
| $S_6$ | 0.00 | 1.65 | 2.32 | 0.00 | 0.00 |
| $S_8$ | 0.00 | 1.56 | 1.04 | 0.00 | 0.00 |
| $CO_2$ | 57.15 | 57.15 | 57.30 | 87.80 | 87.80 |
| $H_2$ | 19.82 | 19.82 | 19.83 | 17.76 | 17.76 |
| CO | 32.02 | 32.02 | 31.96 | 6.18 | 6.18 |
| COS | 6.48 | 6.48 | 6.39 | 1.83 | 1.83 |
| $CS_2$ | 0.17 | 0.17 | 0.17 | 0.01 | 0.01 |
| Total | 513.10 | 487.08 | 499.83 | 494.59 | 486.48 |
| Temperature, ° F. | 1821 | 500 | 599 | 842 | 135 |
| Pressure, psia | 50 | 50 | 50 | 50 | 50 |

What is claimed is:

1. A process for the production of hydrogen sulfide which comprises:

(a) generating in a first flame zone of a thermal reaction zone a gaseous stream comprising hydrogen and carbon monoxide by partial oxidation of an introduced hydrocarbon in the presence of introduced steam and a source of oxygen to form a reducing flame comprising hydrogen, carbon monoxide and steam, (b) adding sulfur directly to the thermal reaction zone to form by combining with the gaseous stream of the first flame zone a second flame zone having a temperature of at least about 1500° F., wherein a portion of the generated hydrogen reacts with sulfur to form hydrogen sulfide and a portion of the generated carbon monoxide reacts with sulfur to form carbonyl sulfide to yield a first vapor stream comprising steam, unreacted hydrogen, carbon monoxide and sulfur and formed hydrogen sulfide and carbonyl sulfide;

(c) rapidly cooling, within a time of less than 2 seconds, the first vapor stream to a temperature sufficiently low to substantially prevent further reaction of hydrogen and carbon monoxide with sulfur;

(d) further cooling the first vapor stream to a temperature between the melting and dew points of sulfur to condense sulfur in a quantity to yield a second vapor stream containing residual sulfur vapor wherein the amount of carbon monoxide and hydrogen present are in a stoichiometric excess of the amount required to react with the residual sulfur vapor in the second vapor stream;

(e) catalytically converting in a catalytic conversion zone maintained at a temperature from about 300° to about 900° F., substantially all of the residual sulfur in the second vapor stream to hydrogen sulfide by reaction of such residual sulfur with contained hydrogen to form hydrogen sulfide and by reaction of such residual sulfur with contained carbon monoxide to form carbonyl sulfide simultaneous with hydrolysis of at least a portion of carbonyl sulfide present and formed to hydrogen sulfide, wherein at least about 50 percent of the hydrogen sulfide formed in the process is formed in the second flame zone.

2. A process as claimed in claim 1 in which the second flame zone is at a temperature above about 2000° F.

3. A process as claimed in claim 1 in which the first stream is rapidly cooled to a temperature below about 800° F.

4. A process as claimed in claim 1 in which the first vapor stream is cooled within a time less than 1 second to a temperature sufficiently low to prevent further reaction of sulfur with hydrogen and carbon monoxide.

5. A process as claimed in claim 1 in which the first vapor stream is cooled within a time of less than 0.5 second to a temperature sufficiently low to prevent further reaction of sulfur with hydrogen and carbon monoxide.

6. A process as claimed in claim 1 in which the catalytic conversion occurs at a temperature from about 500° to about 900° F.

7. A process as claimed in claim 1 in which the catalytic conversion occurs at a temperature from about 600° to about 800° F.

8. A process as claimed in claim 1 in which the amount of sulfur fed to the thermal reaction zone in an amount of from about 10 to about 100 mole percent in excess of the amount required to react with the formed carbon monoxide and hydrogen.

9. A process as claimed in claim 1 in which the amount of steam introduced to the thermal reaction zone is sufficient to provide an effluent from the catalytic conversion zone of at least two volume percent steam.

10. A process as claimed in claim 1 in which the hydrocarbon is a normally liquid hydrocarbon and is preheated to at least 300° F. prior to introduction to the thermal reaction zone.

11. A process as claimed in claim 10 in which the hydrocarbon is preheated to a temperature sufficient to vaporize at least 50% of the hydrocarbon.

12. A process as claimed in claim 1 in which the amount of hydrogen and carbon monoxide present in the gas stream after sulfur condensation is from about 1 to about 10 mole percent in excess of the molar amount of sulfur remaining in the gas stream.

13. A process for the production of hydrogen sulfide which comprises:
    (a) generating in a first flame zone of a thermal reaction zone a stream comprising hydrogen and carbon monoxide by partial oxidation of an introduced hydrocarbon in the presence of introduced steam and a source of oxygen to form a reducing flame comprising hydrogen, carbon monoxide and steam;
    (b) directly adding to the reducing flame in the thermal reaction zone sulfur in an amount to provide sulfur in an amount from about 10 to about 100 mole percent in excess of the amount of hydrogen and carbon monoxide present in the reducing flame to form a second flame zone having a temperature of at least about 1500° F. wherein a portion of the generated hydrogen reacts with sulfur to form hydrogen sulfide and a portion of the generated carbon monoxide reacts with sulfur to form carbonyl sulfide to yield a first vapor stream comprising steam, unreacted hydrogen, carbon monoxide and sulfur and formed hydrogen sulfide and carbonyl sulfide;
    (c) rapidly cooling within a time of 2 seconds the first vapor stream to a temperature below about 800° F. to substantially prevent further reaction of hydrogen and carbon monoxide with sulfur;
    (d) further cooling the first vapor stream to a temperature from the melting point of sulfur to about 600° F. to condense sulfur in a quantity to yield a second vapor stream containing residual sulfur vapor wherein the amount of carbon monoxide and hydrogen present are in a stoichiometric excess of the amount required to react with the residual sulfur vapor in the second vapor stream; and
    (e) catalytically converting in a catalytic conversion zone maintained at a temperature from about 500° to about 900° F., substantially all of the residual sulfur in the second vapor stream to hydrogen sulfide by reaction of such residual sulfur with contained hydrogen to form hydrogen sulfide and by reaction of such residual sulfur with contained carbon monoxide to form carbonyl sulfide simultaneous with hydrolysis of at least a portion of carbonyl sulfide present and formed to hydrogen sulfide, wherein at least about 50 percent of the hydrogen sulfide formed is formed in the second flame zone.

14. A process as claimed in claim 13 in which the second flame zone is at a temperature above about 2000° F.

15. A process as claimed in claim 13 in which the first vapor stream is cooled to below about 800° F. within a time of less than 1 second.

16. A process as claimed in claim 13 in which the first vapor stream is cooled to below about 800° F. within a time of less than 0.5 second.

17. A process as claimed in claim 13 in which the catalytic conversion occurs at a temperature from about 600° to about 800° F.

18. A process as claimed in claim 13 in which the hydrocarbon is a normally liquid hydrocarbon is preheated to at least 300° F. prior to introduction to the thermal reaction zone.

19. A process as claimed in claim 18 in which the hydrocarbon is preheated to a temperature sufficient to vaporize at least 50% of the hydrocarbon.

20. A process as claimed in claim 13 in which the amount of hydrogen and carbon monoxide present in gas streams after sulfur condensation is from about 1 to about 10 mole percent in excess of the molar content of sulfur remaining in the gas stream.

21. A process for the production of hydrogen sulfide which comprises:
    (a) generating in a first flame zone of a thermal reaction zone a gaseous stream comprising hydrogen and carbon monoxide by partial oxidation of an introduced hydrocarbon in the presence of introduced steam and a source of oxygen to form a reducing flame comprising hydrogen, carbon monoxide and steam;
    (b) directly adding to the reducing flame in the thermal reaction zone sulfur in an amount of from about 10 to about 100 mole percent in excess of the amount of hydrogen and carbon monoxide present in the reducing flame to form a second flame zone having a temperature of at least about 1500° F. wherein a portion of the provided hydrogen reacts with sulfur to form hydrogen sulfide and a portion of the provided carbon monoxide reacts with sulfur to form carbonyl sulfide to yield a first vapor stream comprising steam, unreacted hydrogen, carbon monoxide and sulfur and formed hydrogen sulfide and carbonyl sulfide;
    (c) cooling within a time of 2 seconds the first vapor stream to a temperature below about 800° F. to substantially prevent further reaction of hydrogen and carbon monoxide with sulfur;
    (d) further cooling the first vapor stream to a temperature above the melting point of sulfur to about 500° F. to condense sulfur in a quantity to yield a second vapor stream containing residual sulfur vapor wherein the amount of carbon monoxide and hydrogen present are at least in a stoichiometric excess of one molar percent of the residual sulfur vapor in the second vapor stream;

(e) heating the gas stream to a temperature above about 600° F.;

(f) catalytically converting in a catalytic conversion zone maintained at a temperature from about 600° to about 900° F. substantially all of the residual sulfur in the second vapor stream to hydrogen sulfide by reaction of such residual sulfur with contained hydrogen to form hydrogen sulfide and by reaction of such residual sulfur with contained carbon monoxide to form carbonyl sulfide simultaneous with hydrolysis of at least a portion of carbonyl sulfide present and formed to hydrogen sulfide; and (g) cooling the gas stream from the catalytic combustion zone to the dew point of water to condense water, wherein at least about 50 percent of the hydrogen sulfide formed is formed in the second flame zone.

22. A process as claimed in claim 21 in which the second flame zone is at a temperature above about 2000° F.

23. A process as claimed in claim 21 in which the first vapor stream is cooled to below about 800° F. within a time of less than 1 second.

24. A process as claimed in claim 21 in which the first vapor stream is cooled to below about 800° F. within a time of less than 0.5 second.

25. A process as claimed in claim 21 in which the amount of stream introduced to the thermal reaction zone is sufficient to provide an effluent from the catalytic conversion zone to at least two volume percent steam.

26. A process as claimed in claim 21 in which the hydrocarbon is a normally liquid hydrocarbon and preheated to at least 300° F. prior to introduction to the thermal reaction zone.

27. A process as claimed in claim 26 in which the hydrocarbon is preheated to a temperature sufficient to vaporize at least 50% of the hydrocarbon.

28. A process as claimed in claim 21 in which the amount of hydrogen and carbon monoxide present in gas streams after sulfur condensation is from about 1 to about 10 mole percent in excess of the molar content of sulfur remaining in the gas stream.

* * * * *